United States Patent [19]
Hibbert et al.
[11] Patent Number: 4,755,909
[45] Date of Patent: Jul. 5, 1988

[54] FUSED DISCONNECT SWITCH WITH NON-METALLIC ENCLOSURE

[75] Inventors: David A. Hibbert, South Windsor; Larry J. Newmark, Avon, both of Conn.

[73] Assignee: General Electric Company, New York, N.Y.

[21] Appl. No.: 26,496

[22] Filed: Mar. 16, 1987

[51] Int. Cl.[4] .......................... H01H 9/00; H02B 1/00

[52] U.S. Cl. .................................... 361/331; 200/308; 361/356

[58] Field of Search ........................ 361/331, 356–363, 361/364; 200/16 D, 163, 303, 308, 50 A; 220/331, 213, 244, 252, 345

[56] References Cited

U.S. PATENT DOCUMENTS

| | | | |
|---|---|---|---|
| 2,804,986 | 9/1957 | Jeffers et al. | 220/331 |
| 4,180,712 | 12/1979 | Lutzenberger et al. | 200/303 X |
| 4,233,482 | 11/1980 | DiMarco et al. | 200/163 |
| 4,675,782 | 6/1987 | Hibbert et al. | 361/356 |
| 4,688,146 | 8/1987 | Newmark et al. | 361/364 |
| 4,698,727 | 10/1987 | Hibbert et al. | 361/356 |

*Primary Examiner*—J. R. Scott
*Attorney, Agent, or Firm*—Richard A. Menelly; Walter C. Bernkopf; Fred Jacob

[57] ABSTRACT

A fused disconnect switch is contained within a molded plastic cover pivotally attached to a molded plastic case. The switch contact blade is directly attached to the cover whereby movement of the cover in one direction slidingly connects the switch contact blade between the line and load stabs mounted within the case. Movement of the cover in an opposite direction slidingly disconnects the switch contact blade from the line and load stabs. Elongated slots integrally formed within the cover and the case cooperate to prevent access to the switch components when the switch blade is in its "ON" position. The configuration of the slots allow for locking the switch in either the "ON" or "OFF" position.

18 Claims, 8 Drawing Sheets

FUSED DISCONNECT SWITCH WITH NON-METALLIC ENCLOSURE

BACKGROUND OF THE INVENTION

Fused disconnect switches of the type containing a replaceable fuse in series between the load and line terminals of a mechanical switch are currently arranged within metallic enclosures. The operating handle for moving the switch between "ON" and "OFF" positions is located either through the side of the enclosure case or through the cover. One such example of an enclosed fuse disconnect switch is found within U.S. Pat. No. 4,233,482. When such switches are arranged within metallic enclosures, extra insulation must be provided within the enclosure to ensure electrical integrity between the operating components. Means are required for electrical connection between the metallic enclosure and ground. Further, when such a fuse disconnect switch is environmentally exposed, a rustproof coating must be applied to the enclosure.

Some non-metallic enclosures for both circuit breakers and switches are currently available which require no protective coating nor extra dielectric insulation. U.S. Pat. No. 4,675,782 entitled "Molded Plastic Enclosure For Disconnect Switches", describes a three-piece molded plastic enclosure wherein electrical connection is controlled by moving a pair of electrical conductor blades mounted on a sqparable insulated handle in and out of contact with a corresponding pair of stab conductors mounted within the enclosure.

U.S. Pat. No. 4,688,146 entitled "Molded Plastic Enclosure For Electric Service Apparatus" describes a three-piece molded plastic enclosure for conventional electric service entry apparatus such as meters, fuses, circuit breakers and U.S. Pat. No. 4,698,727 entitled "Compact Non-metallic Load Center Enclosure", describes a molded plastic load center enclosure including a plurality of conventional molded case circuit breakers. All of the aforementioned U.S. patent applications are incorporated herein for reference purposes.

The aforementioned U.S. Patents, each describe some type of handle operator to move the switch or circuit breaker between its "ON"-"OFF" conditions along with a cover and a case. One purpose of the instant invention is to describe a non-metallic enclosure which combines the switch operator with the cover and thereby obviates the need for an auxiliary switch operating member.

SUMMARY OF THE INVENTION

A two-piece molded plastic fused disconnect switch multifunctionally employs the cover as the switch operating member by attaching the movable contact blade to the inner surface of the cover and arranging the line and load terminal stabs under the contact blade within the case. A slot arrangement within the case cooperates with a pair of flexible tabs on the cover to prevent opening the switch when the contacts are in the "ON" position. Means are provided on the case for locking the switch in either the "ON" or "OFF" position as well as for preventing access to the switch components when the switch is in the "ON" position.

DESCRIPTION OF THE PREFERRED EMBODIMENT

Figure 1:
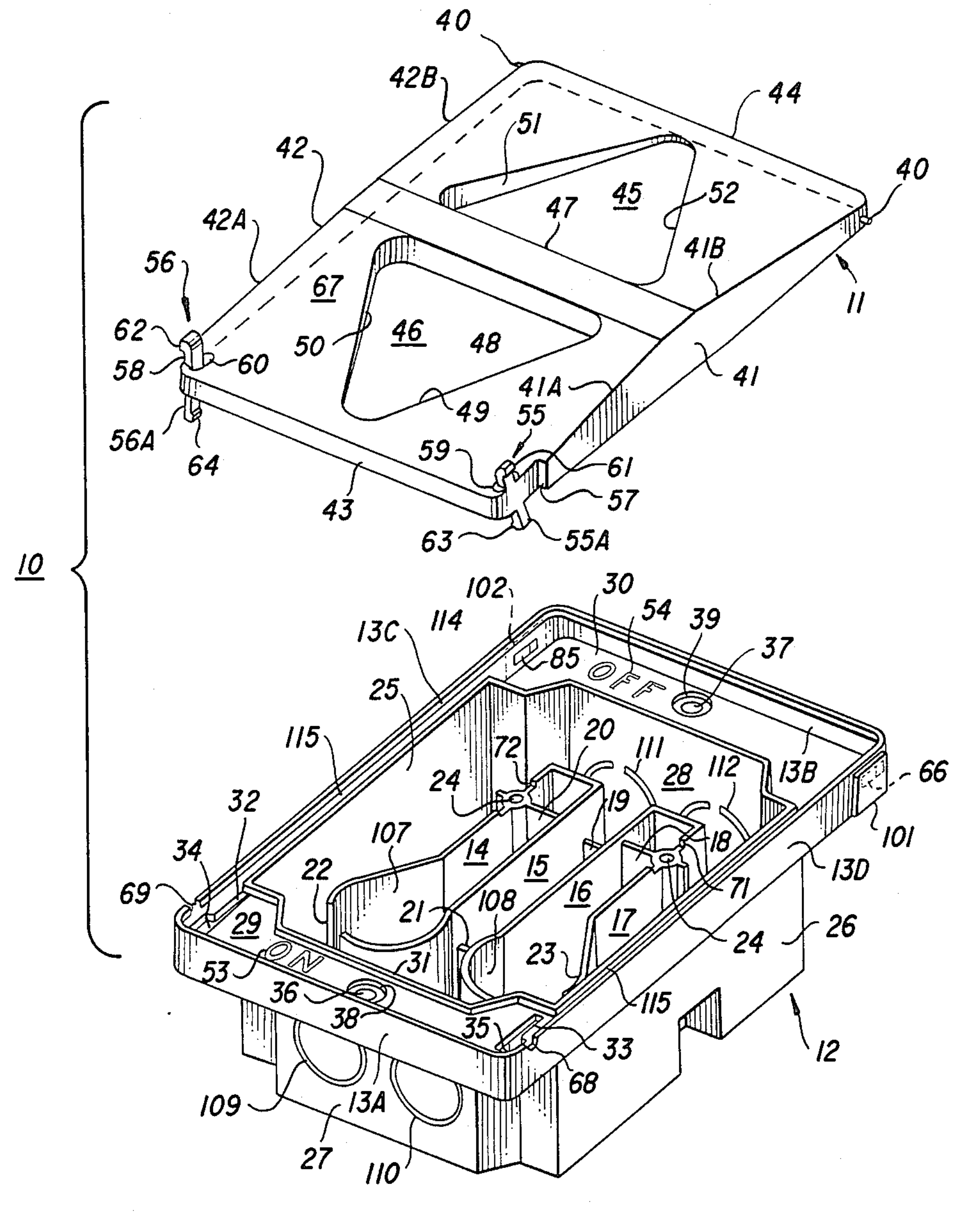
FIG. 1 is an exploded, top perspective view of the cover and case used to form the switch enclosure, according to the invention.

The Fused disconnect switch enclosure 10, shown in FIG. 1, includes a cover-operator 11 and a case 12 both formed from a phenylene-oxide plastic resin as well as a modified polymer blend of polyethylene terepthalate or modified polybutylene terepthalate. When visual access to the interior of the enclosure is desired, the cover-operator 11 is formed from a transparent polycarbonate resin. A peripheral rim 13 is integrally formed into the top surface of the case and is defined by front and rear walls 13A, 13B and a pair of opposing side walls 13C, 13D, as indicated. Also integrally formed within the case are barriers 14, 15, 16 and 17, which provide support as well as electrical isolation to the components supported within the barriers. Ribs 18–21 provide structural support to the barriers while internally threaded screw holes 24 provide means for attaching the switch components to the case. The case includes a pair of opposing side walls 25, 26 and opposing end walls 27, 28, which extend inboard of the peripheral rim. A forward platform 29 is formed between the front peripheral rim wall 13A and a perimetric lip 31 extending upwards from the front, rear and side walls of the case. A rear platform 30 extends between the rear peripheral rim wall 13B and the perimetric lip 31. To provide a guide for sliding motion of the cover-operator and to lock the cover-operator to the case, a pair of narrow slots 32, 33 are formed within the forward platform 29 along with a pair of wider slots 34, 35, the function of which will be described below in some detail. Holes 36, 37 formed through the bottom of recesses 38, 39 allow for the insertion of a padlock to lock the cover-operator in the "ON" as well as the "OFF" positions. Pins 40, extending outwards from the back wall 44 of the cover-operator, pivotally support the cover-operator to the base by insertion within the corresponding slotted recesses 65, 66 formed within the peripheral rim 13. A pair of support tabs 101, 102 are formed on the exterior of the peripheral rim to provide reinforcement support to the slotted recesses formed within the peripheral rim as well as to prevent external access to the pins. The cover-operator includes a trapezoidal side wall 41 having downwardly sloping sides 41A, 41B and opposing trapezoidal side wall 42 having similarly downwardly sloping sides 42A, 42B. The front wall 43 and back wall 44 are rectangular, as indicated. A pair of opposingly faced triangular insets 45, 46 are defined by back walls 47, 48 and downwardly sloping side walls 49, 50 and 51, 52. The triangular insets allow for the insertion of an operator's fingers to provide forward and rearward sliding motion to the cover-operator and arrow indication for direction of such motion. The cover-operator can now slide within the recess defined on both sides of the case between the peripheral side walls 13C, 13D and the adjacent walls of the peripheral rim 13. The bottom parts 55A, 56A of the flexible tabs 55, 56, which extend from the bottom surface of the cover-operator at the front, support and guide the cover within the narrow slots 32, 33 while the pins 40, extending from the rear of the cover-operator, support and guide the cover-operator within the slotted recesses 65, 66. "ON" indicia 53 is impressed within the forward platform 29 of the case while "OFF" indicia 54 is impressed within the rear platform 30. The indicia are highlighted by integral relief mold etching. With the cover-operator slidingly and hingeably attached to the case, the flexible tabs 55, 56 formed integral with the side walls 41, 42 within recesses 57, 58 extend downward and are retained within the slots 32, 33 formed within the case. Slots 59 and 60 formed on the cover-operator inboard and adjacent to the flexible tabs allow for clearance of the flexible tabs when flexed toward each other. A pair of top protrusions 61, 62 formed within and facing outwards from the flexible tabs provide additional strength to the tabs and facilitate gripping of the tabs by an operator's fingers. Grooves 68, 69 formed laterally within the side walls 13C, 13D of the peripheral rim 13 further provide tactile access to the flexible tabs. To facilitate the insertion of the switch components, a pair of anti-turn slots 22, 23 are defined between the cylindrical ends of barriers 14, 15 and 16, 17, while anti-turn grooves 71, 72 are formed within the top surface of the outer barriers 14 and 17.

Figures 2A, 2B:
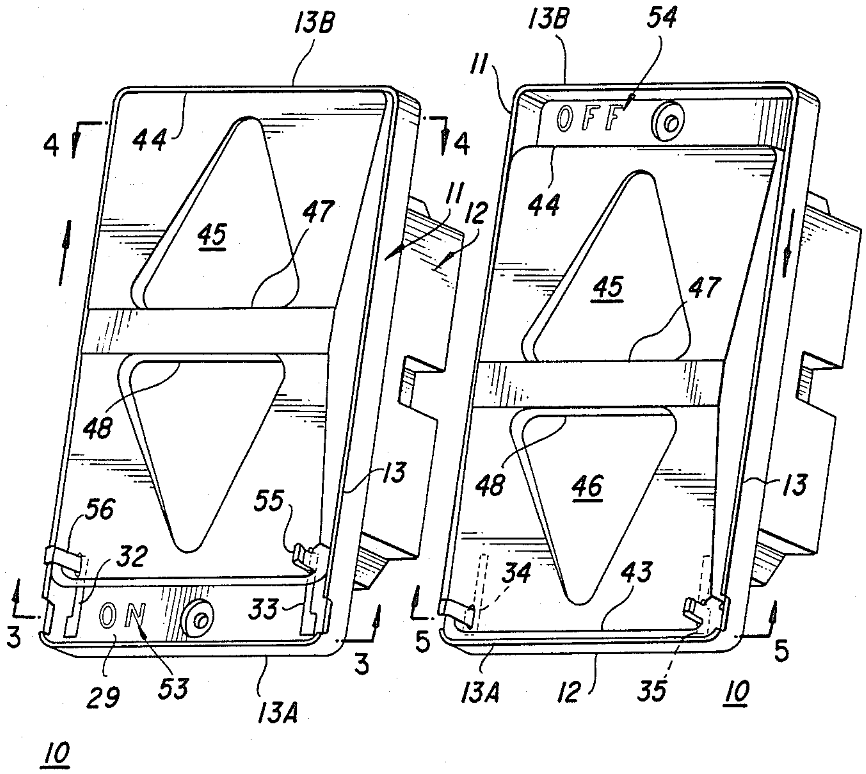
FIGS. 2A and 2B are top perspective views of the assembled enclosure of FIG. 1 with the cover-operator in the "ON" and "OFF" positions respectively.
Figure 3:
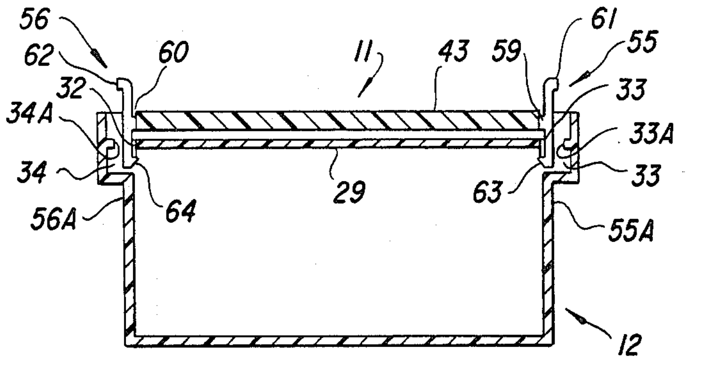
FIG. 3 is a front view of the enclosure of FIG. 2A, in partial section, as viewed in the 3—3 plane.
Figure 4:
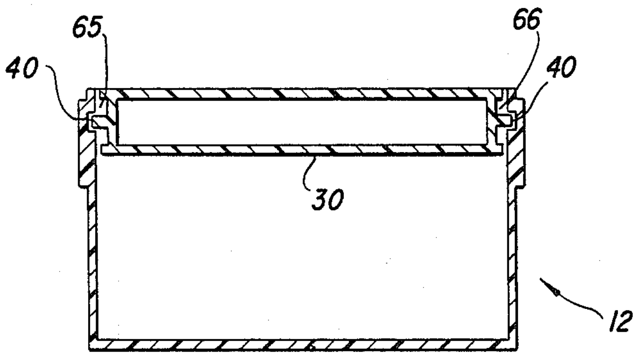
FIG. 4 is a rear view of the switch enclosure of FIG. 2A, in partial section, as viewed in the 4—4 FIG. 2A, i"plane.
Figure 5:
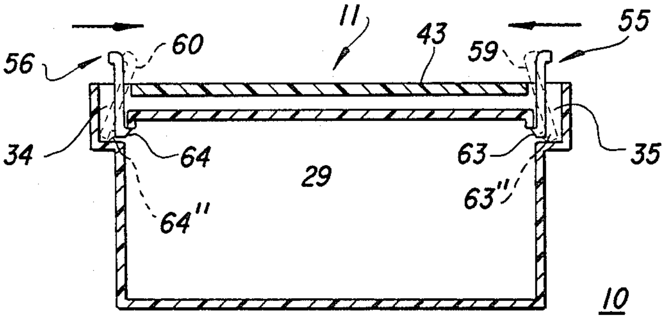
FIG. 5 is a front view of the switch enclosure of FIG. 2A, in partial section, with the cover-operator in the "OFF" condition.

The locking function of the cover-operator 11 is best seen by referring now to FIGS. 2A, 2B, 3 and 5 wherein the cover-operator is shown attached to the case 12 to form the complete enclosure 10. By placing a finger against the lock wall 48 within the triangular inset 46 and sliding the cover-operator in the indicated direction shown in FIG. 2A, the front wall 43 of the cover-operator moves away from the peripheral rim front wall 13A and the "ON" indicia 53 becomes visible. The flexible tabs 55, 56 are positioned within the narrow slots 32, 33 and cannot be pressed toward each other because of interference with the edges 32A, 33A of the narrow slots as best seen in FIG. 3. If an attempt is now made to rotate the cover-operator 11 clockwise to the open position, the bottom offsets 63, 64 on the flexible tabs are stopped by the bottom of the forward platform 29. The pins 40 formed in the cover sidewalls next to the rear platform 30 remain within their respective elongated recesses 66 formed in the case 12, as best seen in FIG. 4.

By placing a finger against the back wall 47 formed in the triangular inset 45 and sliding the cover-operator in the direction indicated in FIG. 2B, the front wall of the cover-operator is moved the front 13A of the peripheral rim 13 and the back wall 44 of the cover-operator is moved away from the rear 13B of the peripheral rim, thereby exposing the "OFF"indicia 54. When the flexible tabs 55, 56 are depressed inwardly toward each other, as shown in phantom in FIG. 5, the bottom offsets 63, 64 are now positioned within the wider slots 34, 35 as indicated in phantom at 63", 64". When the tabs 55, 56 are pulled in the upward direction, the bottom offsets are now able to clear the bottom surface of the forward platform 29 and enable the cover-operator 11 to be rotated to the open position.

Figure 6:
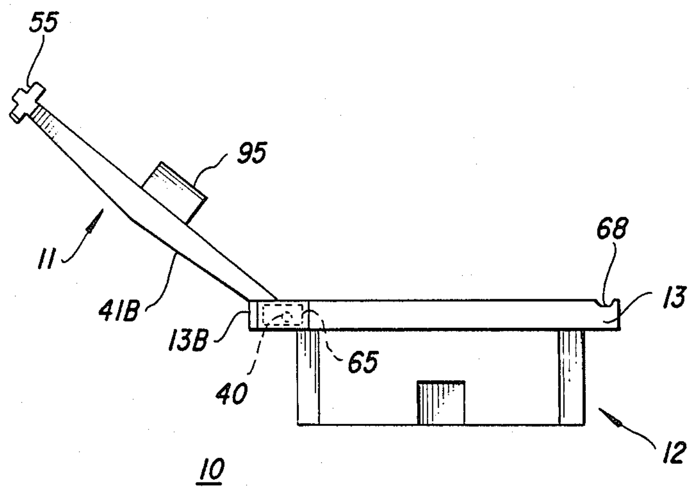
FIG. 6 is a side view of the switch enclosure of FIG. 1 with the cover-operator depicted in the "open" position.

The open position of the cover-operator 11 is shown in FIG. 6 with the sloping side 41B stopped against the peripheral rim rear wall 13B. This prevents the pins 40 on the cover-operator 11 from moving out of the slotted recesses 65, 66 formed within the peripheral rim 13. The provision of the wide and narrow slots to prevent the cover-operator from becoming opened when electrical components contained therein are in the "ON" or electrically energized condition is an important feature of the instant invention. Also shown in FIG. 6 is one of the access grooves 68 described earlier for facilitating tactile access with the flexible tabs 55, 56. An insulating pedestal 95 is integrally formed within the bottom surface of the cover-operator 11 to support a pair of angled stabs 99, as seen by referring now to FIG. 9. The pedestals 95 consist of a pair of opposing sidewalls 97 joined by a platform 96. An internally threaded screw hole 98 is formed through the top surface of the platform to facilitate attachment of the angled stabs by means of screw 79 and through-hole 100 formed through the stab. The blade extension 113 on the stab facilitates connection with the stab connectors 88 shown in FIG. 8, which will be discussed below in some detail. The bottom surfaces 45', 46' of the triangular insets, depicted earlier as slopingly depressed below the top exterior surface of the cover-operator 11, are shown herein slopingly elevated above the opposite surface 67' of the cover-operator.

Figure 7A:
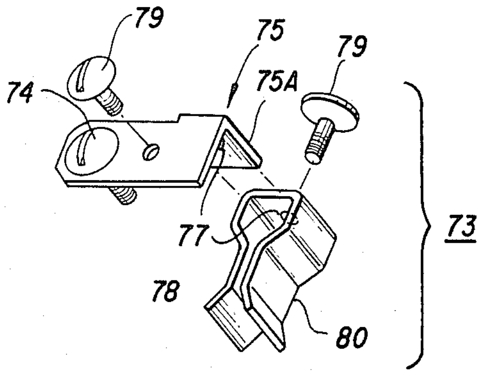
FIGS. 7A and 7B are top perspective views, in isometric projection, of the line terminal and load terminal switch components respectively.
Figure 7B:
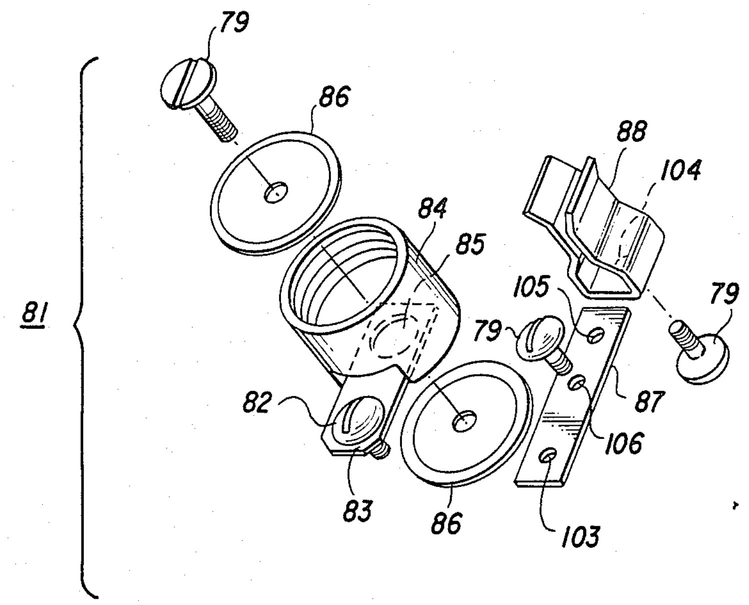

The line terminal assembly 73 and the load terminal assembly 81 are depicted in FIGS. 7A and 7B and are assembled as follows. An angled connector 75 of an electrically conductive material, such as copper or a copper alloy, is provided with a line terminal screw 74 and is arranged within through-holes 76 and 77 in the indicated locations. Downwardly depending part 75A is inserted within a stab connector 80 and is fastened thereto by means of screw 79 extending within the through-hole 77 and engaging the threaded screw hole 78 formed in the angled connector 75. Another screw 79 is inserted within through-hole 76, the angled connector 75 is positioned over rib 20 within the case shown in FIG. 1, and the screw is threadingly engaged with the screw hole 24. The angled connector then extends within the anti-turn groove 72, formed within barrier 14, which allows the screw 79 to be tightened without disturbing the angled connector and also allows the line screw 74 to be tightened as well as loosened without effecting the security of screw 79. A similar line terminal assembly 73 is arranged over rib 18 and is positioned within anti-turn groove 71 before being fastened thereto by means of screw hole 24 formed within barrier 17.

The load terminal assembly 81, shown in FIG. 7B, includes a fuse receptacle in the form of an internally threaded copper cylinder 84 welded to a tin-plated copper strap 83 with a thru-hole 85 formed therein and positioned concentric to the cylinder. A pair of insulating apertured disks 86 are positioned above and beneath the cylinder and the cylinder is attached to a second copper strap 87 by the insertion of a screw 79 through the cylinder and the disks and tightening the screw within the screw hole 103 threaded within the second strap. A stab connector 88 is fastened to the opposite end of the second strap by inserting the opposite end of the second strap within the stab connector and fastening thereto by inserting a separate screw 79 within the thru-hole 104 formed in the connector and fastening the screw to the hole 105 threaded within the second strap. The load terminal assembly is arranged within the case 12 shown in FIG. 1 by positioning the assembly within the corridor 107 defined between barriers 14, 15 and positioning the strap 83 within the anti-turn slot 22 formed therein. The load terminal assembly is then fastened to the case by inserting an additional screw 79 within a thru-hole 106 formed in the second strap and engaging a threaded screw hole (not shown) formed in the bottom of the case. A similar load terminal assembly 81 is positioned within the second corridor 108 defined between barriers 16 and 17, as shown in FIG. 1, and is attached to the case in a similar manner.

Figure 8:
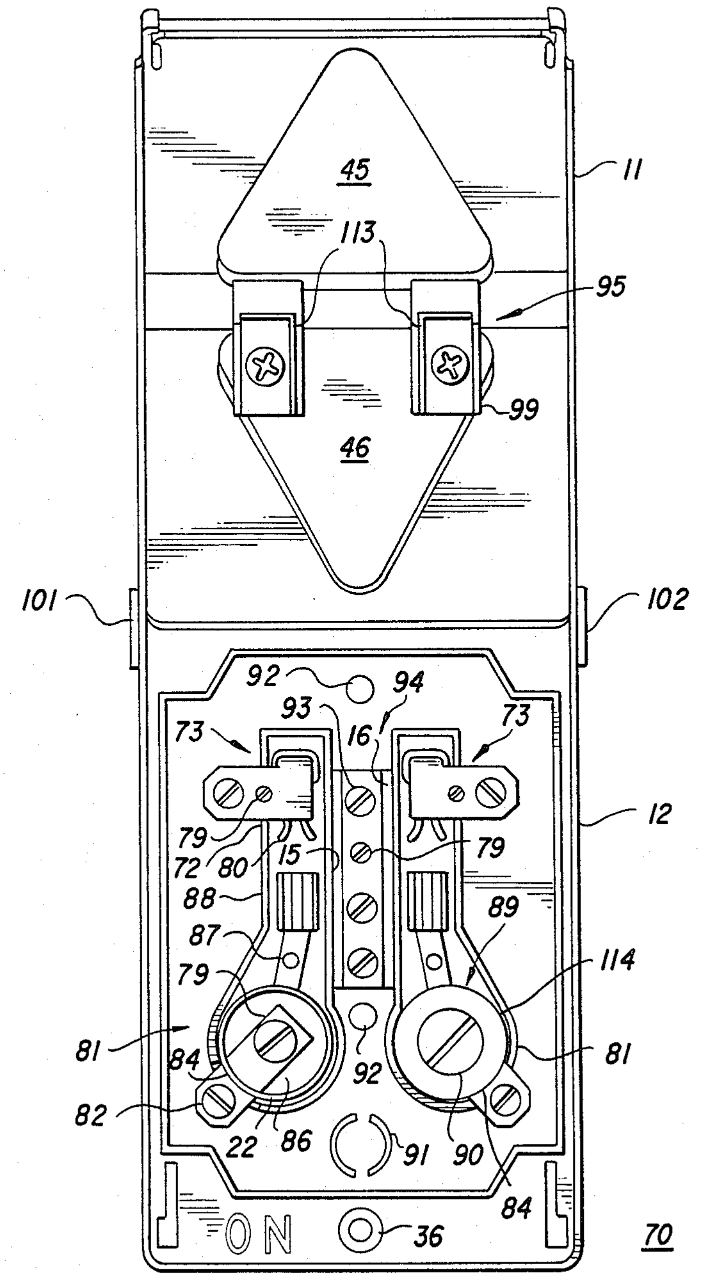
FIG. 8 is a top view of the fused switch, according to the invention, with the cover-operator in an "open" position.
Figure 9:
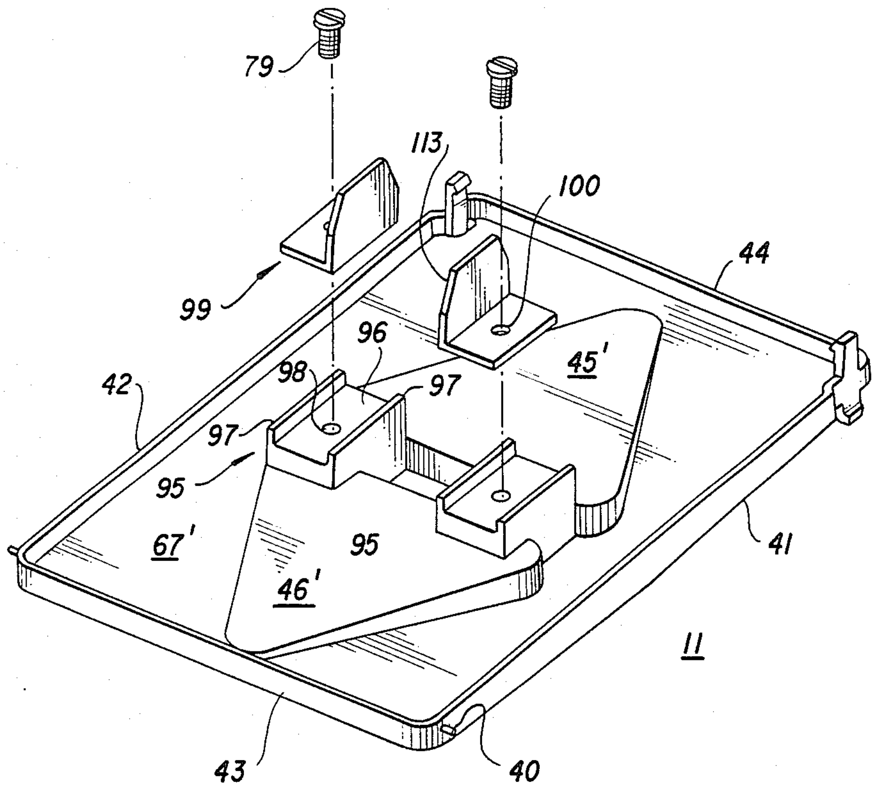
FIG. 9 is a top perspective view, in isometric projection, of the reverse side of the cover-operator depicted in FIG. 1.

The attachment of the line terminal assembly 73 and load terminal assembly 81 to the switch enclosure 10 of FIG. 1 forms the complete fused switch 70 now shown in FIG. 8. Electrical access to the load terminal assemblies 81 are made by knockouts 109, 110 formed within the end wall 27, shown in FIG. 1, while electrical access to the line terminal assembly 73 is made by means of knockouts 111, 112 formed within end wall 28. A good description of suitable knockouts for an injection molded plastic case is found aforementioned within U.S. Pat. No. 4,688,146. Referring back to FIG. 8, a neutral strap 94 is shown attached between the two interior barriers 15, 16 by threadingly engaging a screw 79 through the strap with a threaded screw hole (not shown) formed in the bottom of the case 12. Neutral terminal screws 93 provide electrical connection with the strap while a knockout 91 formed within the bottom of the case provides electrical access to the ground terminal screws. The fused switch is attached to a wall by means of screw holes 92 formed through the bottom of the case on opposite sides of the ground strap, as indicated. The cover-operator 11 is herein depicted in its "open" position within the support tabs 101, 102 formed on the exterior of the case 12. The pedestals 95 are formed within the cover-operator 11 in such a manner that the blade extensions 113 line up with the corresponding stab connectors 80, 88 positioned within the case for operating the switch between its "ON" and "OFF" conditions. A cylindrical-type plug fuse 89 is inserted within the threaded cylinders 84 within the load terminal assemblies. The fuses contain an indicating window 90 to determine the condition of the fusible link 114. Although only one fuse 89 is depicted in FIG. 8, a second fuse is inserted within the other load terminal assembly 81 which fuse is omitted to show the detail of the insulating disk 86 which insulates the attachment screw 79 from the conductive cylinder 84, while permitting electrical transport through the fuse from the load terminal screw 82 to the stab connectors 88. The cover-operator 11 is preferably formed from a transparent plastic material to allow visual access to the indicating window 90 to determine the condition of the fuses. This is especially helpful when the cover-operator 11 is in its "closed" position on the case and a padlock (not shown) is inserted within the hole 36, which locks the fused switch in its "ON" condition.

Figure 10:
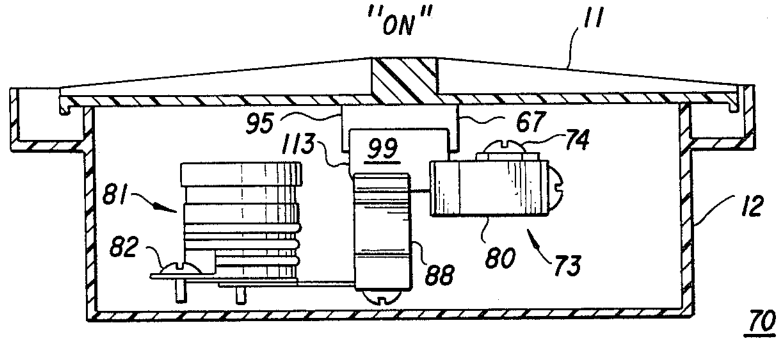
FIG. 10 is a side view, in partial section, of the fused switch of FIG. 8 with the cover-operator in the "ON" condition.
Figure 11:
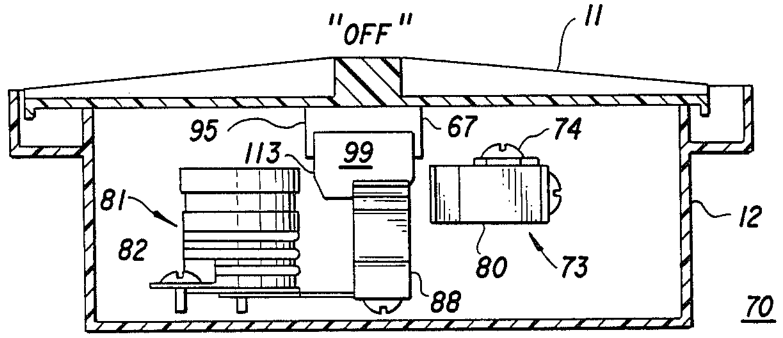
FIG. 11 is a side view, in partial section, of the fused switch of FIG. 8 with the cover-operator in the "OFF" position.

The movement of the cover-operator 11 between its "ON" and "OFF" positions is best seen by referring now to FIGS. 10 and 11. In FIG. 10, with the cover-operator 11 in its "ON" position, the pedestal 95 and angled stab 99 are positioned such that the blade extension 113 extends between the line terminal assembly 73 and the load terminal assembly 81 and electrically engages the stab connector 80 on the line terminal assembly as well as the stab connector 88 on the load terminal assembly to place the switch in the "ON" position. The fused switch is now operational and electric current can transport between the line and load terminal screws 74, 82.

With the fused switch 70 in its "OFF" condition as shown in FIG. 11, the cover-operator 11 is positioned such that the pedestal 95 and angled strap 99 are positioned such that the blade extension 113 only connects with the stab connector 88 within the load terminal assembly 81, such that there is no electrical connection between the line and load terminal screws 74, 82. Repeated sliding of the h operator between the "ON" and "OFF" positions moves the blade extension between the stab connectors in a wiping motion which beneficially removes dust and oxidation produced from both the blade extension and the stab connectors.

It has thus been shown that a two-piece plastic molded compartment with a minimum number of components and only a single moving part is capable of providing a fused electric switch, wherein the fuses contained therein are visible from the exterior of the compartment and whereby the cover-operator cannot be opened to provide access to the internal components unless the fused switch is in its "OFF" condition.

Having thus described our invention, what we claim as new and desire to secure by Letters Patent is:

1. An electric switch enclosure comprising:

a molded plastic case including integral top and bottom opposing end walls joined by a pair of integral opposing sidewalls and a back wall;

an upstanding peripheral rim integrally formed with said case extending around said sidewalls and said end walls;

a fist platform integrally formed with said case and extending from a top part of said bottom end wall intermediate a front part of said peripheral rim and said bottom end wall, said first platform having a pair of dual thickness slot means formed in opposite sides thereof;

a pair of elongated guide insets formed within said peripheral rim; and a molded plastic cover-operator pivotally attached to said case and having a pair of flexible tabs integrally formed therein at a first end and having a bottom part of said tabs extending within said slot means when said cover-operator is closed against said case.

2. The electric switch enclosure of claim 1 wherein said cover-operator further includes a pair of pins each of said pins extending from each side of a second end opposite said first end, said pins being positioned within said guide insets to provide lateral guide motion of said cover-operator back and forth in a first plane and to provide pivotal motion of said cover-operator in a second plane, perpendicular to said first plane.

3. The electric switch enclosure of claim 1 including a second platform extending from said top end wall.

4. The electric switch enclosure of claim 1 wherein said flexible tabs each include a top part extending above said peripheral rim providing tactile access to said flexible tabs.

5. The electric switch enclosure of claim 4 further including groove means formed within said peripheral rim proximate each of said flexible tabs to provide further tactile access to said flexible tabs.

6. The electric switch enclosure of claim 1 wherein said slot means includes a first slot and a second slot, said second slot having a width greater than said first slot to allow for clearance of said bottom part of said flexible tabs when said bottom part of said flexible tabs is inserted within and removed from said second slot to allow said cover-operator to rotate between closed and open positions.

7. The electric switch enclosure of claim 1 further including "ON" indicia impressed within said first platform.

8. The electric switch enclosure of claim 3 further including "OFF" indicia impressed within said second platform.

9. The electric switch enclosure of claim 2 further including first and second recess means formed within a front surface of said cover-operator to provide means for tactile contact with said cover-operator to move said cover-operator back and forth within said first plane.

10. The electric switch enclosure of claim 3 wherein said first and second platforms each include a thru-hole for insertion of a padlock to lock said cover-operator in "ON" and "OFF" positions.

11. The electric switch enclosure of claim 2 further including detent means integrally formed on said bottom part of said tabs, said detent means interfering with a bottom surface of said first platform when extending within said first slot width to prevent rotation of said cover-operator within said second plane to an open position.

12. The electric switch enclosure of claim 1 including first knockout means integrally formed within said top end wall for providing electrical access to a top part of said case.

13. The electric switch enclosure of claim 1 including second knockout means integrally formed within said bottom end wall for providing electrical access to a bottom part of said case.

14. The electric switch enclosure of claim 1 including third knockout means integrally formed within said back wall for providing electrical access to a central part of said case.

15. The electric switch enclosure of claim 1 further including a pair of electrical isolation corridors integrally formed with said case and extending from said back wall, each of said corridors bounded by a pair of upstanding sidewalls joined at one end by a rectangular end wall and joined at an opposite end by a cylindrical end wall.

16. The electric switch enclosure of claim 15 wherein at least one of said upstanding sidewalls includes an anti-turn slot formed within a top surface thereof.

17. The electric switch enclosure of claim 15 wherein at least one of said cylindrical end walls includes an anti-turn slot formed within one side thereof.

18. The electric switch enclosure of claim 9 wherein said cover-operator further includes a pair of pedestals integrally formed with said cover and extending from a rear surface thereof.

* * * * *